(12) United States Patent
Liang et al.

(10) Patent No.: US 8,613,594 B2
(45) Date of Patent: Dec. 24, 2013

(54) FAN APPARATUS WITH FAN MOUNTING FRAME

(75) Inventors: An-Gang Liang, Shenzhen (CN); Zheng-Heng Sun, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 722 days.

(21) Appl. No.: 12/894,177

(22) Filed: Sep. 30, 2010

(65) Prior Publication Data
US 2012/0012287 A1 Jan. 19, 2012

(30) Foreign Application Priority Data
Jul. 19, 2010 (CN) .......................... 2010 1 0230305

(51) Int. Cl.
*F04D 29/62* (2006.01)
(52) U.S. Cl.
USPC .................................. 415/213.1; 416/244 R
(58) Field of Classification Search
USPC .................... 416/244 R; 415/213.1; 361/695
See application file for complete search history.

(56) References Cited

U.S. PATENT DOCUMENTS

| | | | | |
|---|---|---|---|---|
| 6,042,474 A * | 3/2000 | Harvey et al. | ................. | 454/184 |
| 6,442,025 B2 * | 8/2002 | Nakamura et al. | ............ | 361/695 |
| 7,126,818 B2 * | 10/2006 | Lu et al. | ........................ | 361/695 |
| 7,542,275 B2 * | 6/2009 | Sun | .......................... | 361/679.46 |
| 8,317,463 B2 * | 11/2012 | Ye | ................................. | 415/126 |

* cited by examiner

*Primary Examiner* — Ninh H Nguyen
(74) *Attorney, Agent, or Firm* — Altis Law Group, Inc.

(57) ABSTRACT

An exemplary fan apparatus adapted for dissipating heat from an electronic component mounted in an enclosure includes a centrifugal blower, a mounting frame, a number of first fasteners and a number of second fasteners. A number of engaging portions are formed on the enclosure. The centrifugal blower defines an air outlet at one side thereof. A number of fixing portions are formed on the centrifugal blower. The mounting frame includes a number of connecting portions and a number of mounting portions formed thereon. The first fasteners fix the connecting portions of the mounting frame to the engaging portions of the enclosure, and the second fasteners fix the fixing portions of the centrifugal blower to the mounting portions of the mounting frame.

14 Claims, 4 Drawing Sheets

FAN APPARATUS WITH FAN MOUNTING FRAME

BACKGROUND

1. Technical Field

The present disclosure relates to a fan apparatus and, more particularly, to a fan apparatus incorporating a centrifugal blower.

2. Description of Related Art

With the continuing development of electronics technology, electronic components such as central processing units (CPUs) are becoming ever more powerful. Conventionally, the electronic component is mounted on a printed circuit board (PCB), and the PCB is installed in the enclosure of a device such as a personal computer. When the electronic component operates, it generates much heat, which needs to be immediately dissipated.

Conventionally, a centrifugal blower is installed in the computer enclosure with a number of screws, and provides heat dissipation for all the electronic components mounted on the PCB. The centrifugal blower defines an air outlet oriented toward the electronic components, to allow air to flow to the electronic components. However, with the continuous upgrading of most computers, the positions of the electronic components of the upgraded PCB may be different from the previous ones with respect to the computer enclosure and the air outlet of the centrifugal blower. As the centrifugal blower is fixedly mounted on the enclosure with screws, and a location of the air outlet of the centrifugal blower is unchangeable, the path of the airflow cannot be easily adjusted according to requirements of the upgraded PCB. As a result, the air driven out from the air outlet may fail to flow adequately to the electronic components.

Therefore, an improved fan apparatus is desired to overcome the described limitations.

DETAILED DESCRIPTION

Figure 1:
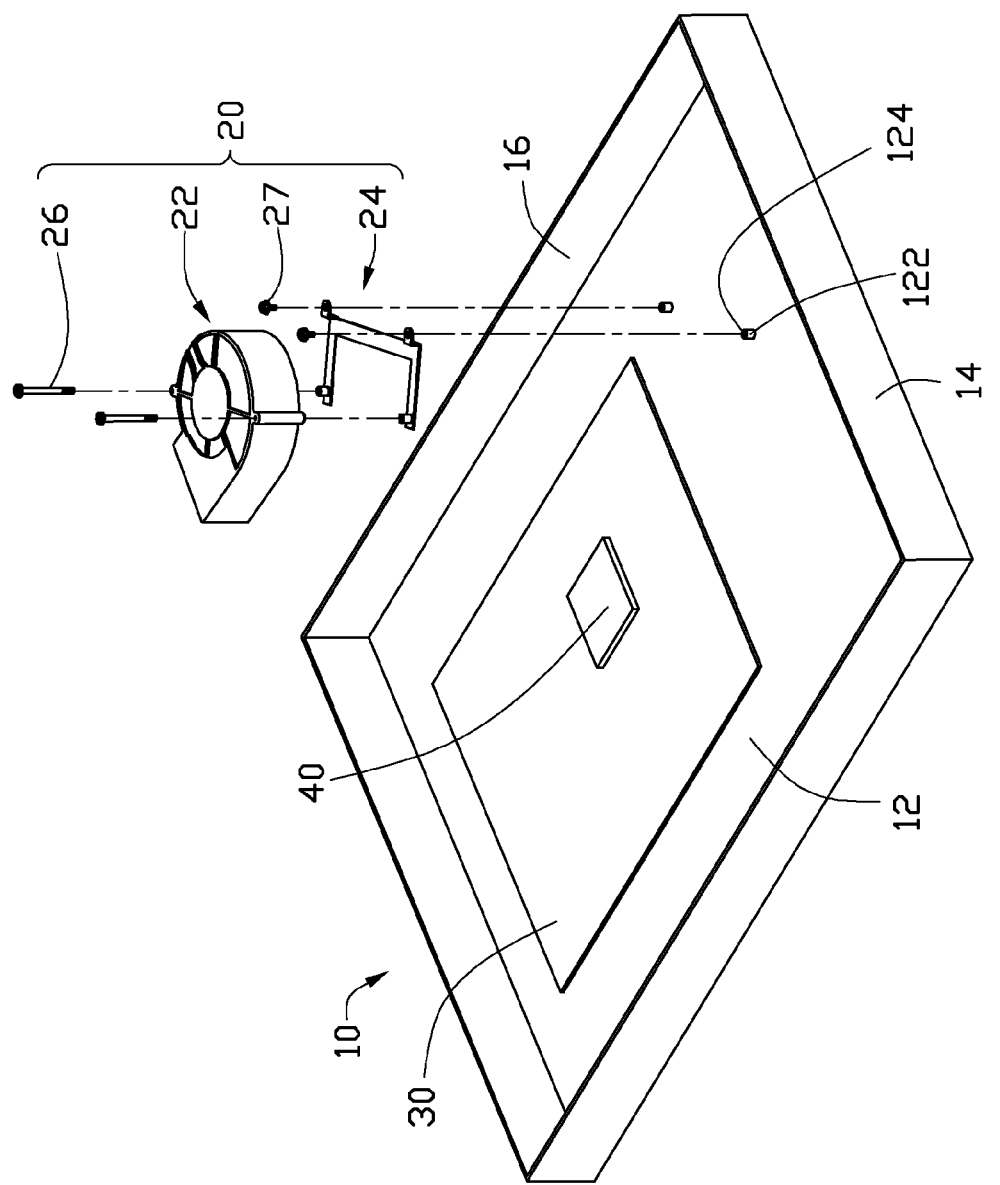
FIG. 1 is an exploded, isometric view of a fan apparatus according to an exemplary embodiment applied in an enclosure of an electronic device.

Referring to FIG. 1, an exemplary fan apparatus 20 is applied in an enclosure 10 of an electronic device, such as a server or another kind of computer. The enclosure 10 includes a rectangular bottom panel 12, a side panel 14 extending upward from a circumference of the bottom panel 12, and a rectangular top panel (not shown). Four side edges of the top panel are respectively connected with top edges of the side panel 14. Thus, the bottom panel 12, the side panel 14, and the top panel cooperatively define a receiving space 16 in the enclosure 10. A circuit board 30 with an electronic component 40 mounted thereon is received in the receiving space 16, and is attached to a top surface of the bottom panel 12. Two engaging posts 122 extend upwardly from the top surface of the bottom panel 12. The engaging posts 122 are located beside the circuit board 30. Each engaging post 122 defines a thread hole 124 therein along an axial direction thereof.

Figure 2:
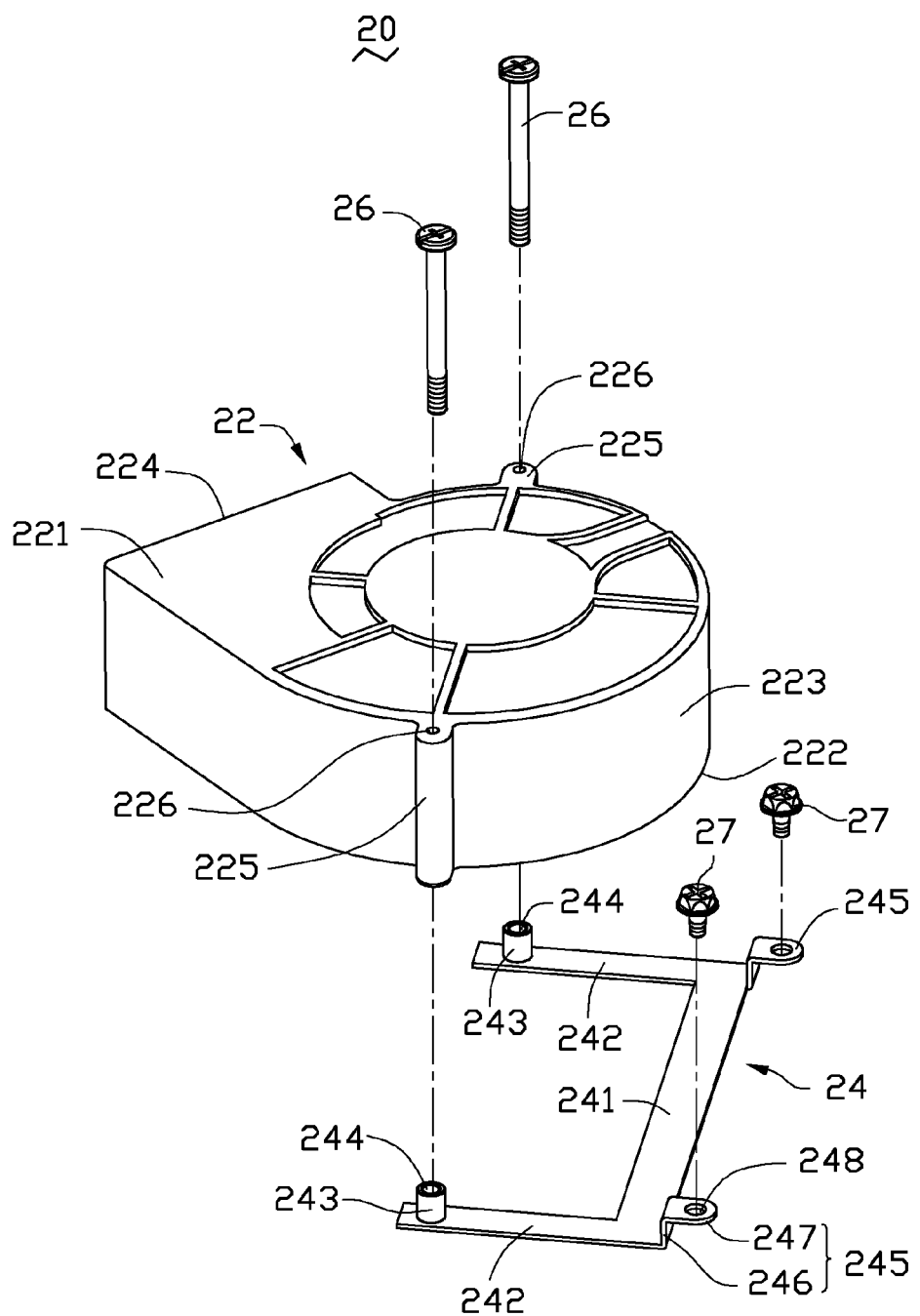
FIG. 2 is an enlarged, exploded, isometric view of the fan apparatus of FIG. 1.

Referring also to FIG. 2, the fan apparatus 20 includes a centrifugal blower 22, a mounting frame 24, two fasteners 26 used for fixing the centrifugal blower 22 onto the mounting frame 24, and two screws 27 used for securing the mounting frame 24 onto the enclosure 10. The centrifugal blower 22 includes a top cover 221, a bottom plate 222, and a sidewall 223 extending between the top cover 221 to the bottom plate 222. An air outlet 224 is defined in the sidewall 223. Two fixing portions 225 extend outwardly from an outer periphery of the sidewall 223. Each fixing portion 225 extends vertically parallel to an axial direction of the centrifugal blower 22. Each fixing portion 225 defines a through hole 226 therein along an axial direction thereof. The fixing portions 225 are symmetrically located at two opposite sides of the centrifugal blower 22.

The mounting frame 24 is U-shaped, and includes an elongated main body 241 and two mounting arms 242 extending substantially perpendicularly from two ends of the main body 241. The mounting arms 242 are located at a same long side of the main body 241, and are substantially parallel with each other. A mounting post 243 extends upwards from a distal end of each mounting arm 242. Each mounting post 243 defines a thread hole 244 therein along an axial direction thereof. Two connecting tabs 245 are respectively formed at the two ends of the main body 241. The connecting tabs 245 protrude outwardly from the main body 241, and are located at a same long side of the main body 241 which is opposite to the long side of the main body 241 where the mounting arms 242 are. Each connecting tab 245 is substantially L-shaped, and includes a first section 246 extending upward from the main body 241 and a second section 247 extending substantially perpendicularly from a top end of the first section 246. The first section 246 has a height equaling that of the engaging post 122 of the enclosure 10. The second section 247 extends generally away from the main body 241 in a direction substantially opposite to direction in which each mounting arm 242 extends. The second section 247 is oriented substantially horizontally, and defines a mounting hole 248 therein.

Figure 3:
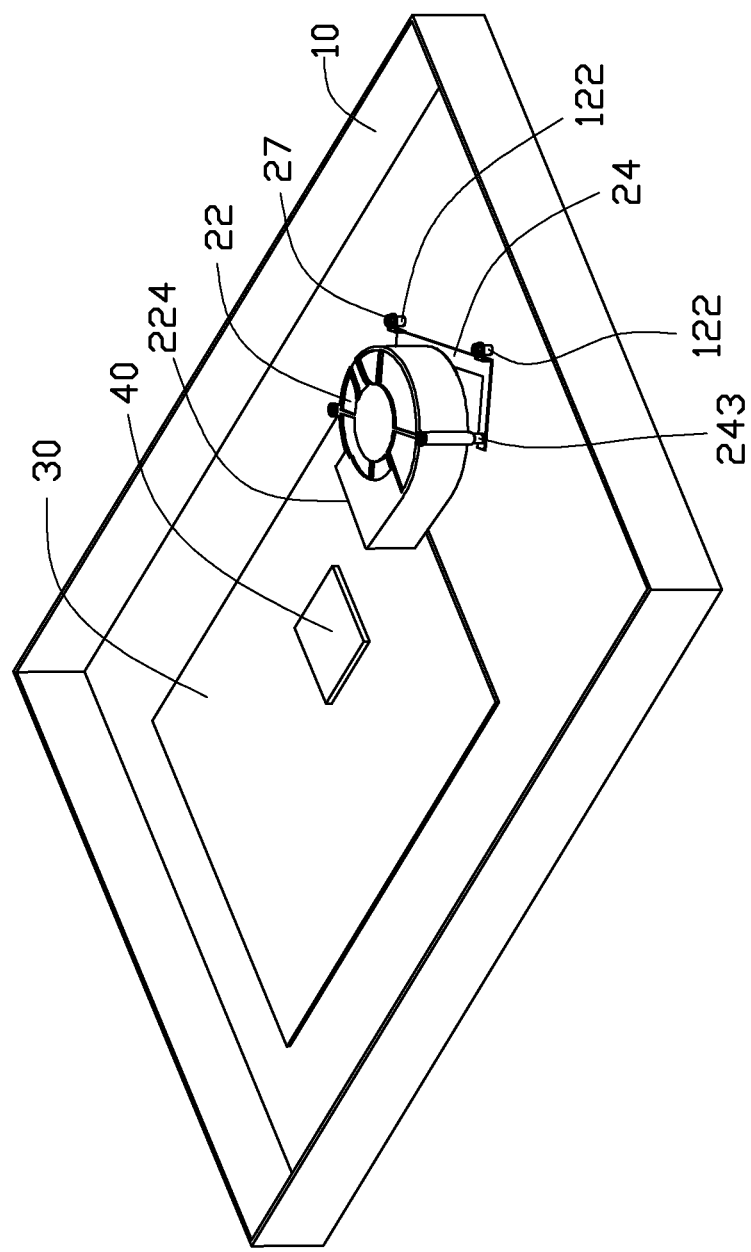
FIG. 3 is an assembled view of the fan apparatus and the electronic device of FIG. 1.
Figure 4:
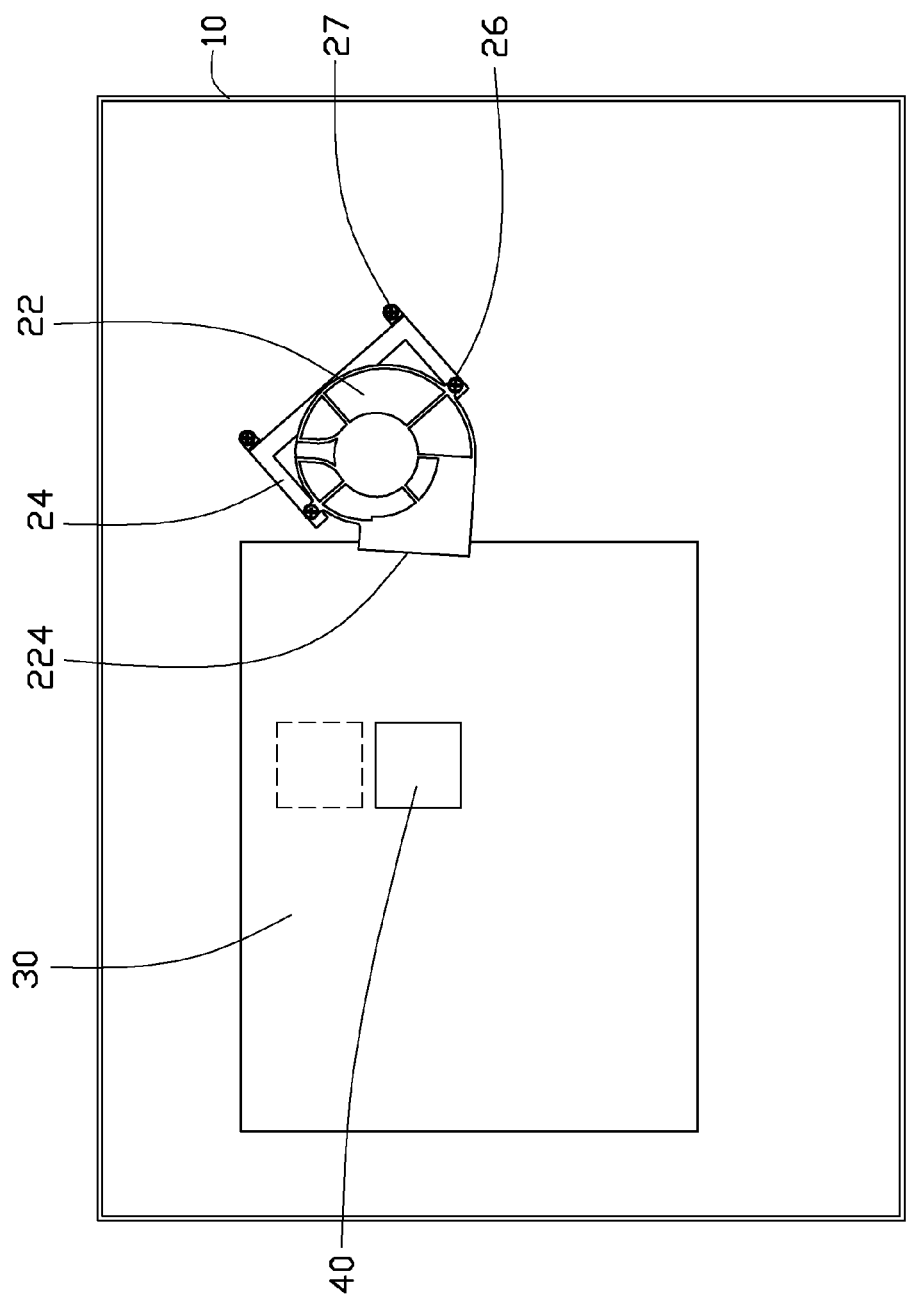
FIG. 4 is a top plan view of the fan apparatus and the electronic device of FIG. 3.

Referring to FIGS. 3 and 4, in assembly, the mounting frame 24 is placed on the bottom panel 12 of the enclosure 10, with the main body 241 of the mounting frame 24 attached to the top surface of the bottom panel 12. The second sections 247 of the connecting tabs 245 are respectively placed on top ends of the engaging posts 122. The mounting holes 248 of the connecting tabs 245 are respectively aligned with the thread holes 244 of the engaging posts 122. The screws 27 are extended through the mounting holes 248 of the second sections 247 of the connecting tabs 245 of the mounting frame 24, and respectively threaded into the corresponding engaging posts 122. Thereby, the mounting frame 24 is fixed on the bottom panel 12 of the enclosure 10. In addition, the fasteners 26 are extended through the through holes 226 of the fixing portions 225 of the centrifugal blower 22 and respectively threaded into the mounting posts 243 of the mounting frame 24. Thereby, the centrifugal blower 22 is fixed on the mounting frame 24. Thus, the centrifugal blower 22 is mounted to the enclosure 10 by the mounting frame 24. The air outlet 224 of the centrifugal blower 22 is oriented toward the electronic component 40.

In FIG. 4, the broken line shows a position of an electronic component of a previous circuit board, which is different from the current circuit board 30. When the previous circuit board was applied in the enclosure 10, the centrifugal blower 22 was directly mounted to the engaging posts 122 of the enclosure 10 by screws. Thus the air outlet 224 of the centrifugal blower 22 was oriented toward the electronic component of the previous circuit board.

In the present embodiment, the current circuit board 30 can be considered as replacing the previous circuit board. The location of the electronic component 40 of the current circuit board 30 is different from the location of the electronic component of the previous circuit board. More specifically, the current electronic component 40 is located closer to the center of the bottom panel 12 of the enclosure 10 than the electronic component of the previous circuit board. Therefore if the centrifugal blower 22 were to be directly mounted to the engaging posts 122 of the enclosure 10, the air outlet 224 of the centrifugal blower 22 would not be oriented toward the current electronic component 40. Due to the provision of the mounting frame 24, the location of the centrifugal blower 22 is changed, with the centrifugal blower 22 being mounted on the mounting frame 24, and the mounting frame 24 in turn being mounted to the engaging posts 122 of the enclosure 10. The air outlet 224 of the centrifugal blower 22 is accordingly changed to be oriented toward the current electronic component 40. Thus, airflow produced by the centrifugal blower 22 is directed to the current electronic component 40 to remove heat from the electronic component 40.

It is to be understood, however, that even though numerous characteristics and advantages of the exemplary embodiment(s) have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan apparatus adapted for dissipating heat from an electronic component, the fan apparatus comprising:
    a centrifugal blower defining an air outlet at one side thereof, a plurality of fixing portions being formed on the centrifugal blower, a through hole being defined in each of the fixing portions;
    a mounting frame comprising:
        a main body; and
        two mounting arms extending from two ends of the main body, the mounting arms being located at a same long side of the main body;
    a plurality of connecting portions formed on the mounting frame, each connecting portion defining a mounting hole therein; and
    a plurality of mounting portions, each mounting portion being in the form of a mounting post, the mounting posts being formed on the mounting arms, respectively, each mounting post defining a thread hole therein;
    an enclosure receiving the centrifugal blower and the mounting frame therein, a plurality of engaging portions being formed on the enclosure, each engaging portion of the enclosure being in the form of an engaging post;
    a plurality of first fasteners fixing the connecting portions of the mounting frame to the engaging portions of the enclosure; and
    a plurality of second fasteners fixing the fixing portions of the centrifugal blower to the mounting portions of the mounting frame;
    wherein the second fasteners are extended through the through holes of the fixing portions of the centrifugal blower, respectively, and each second fastener is threaded into the thread hole of a corresponding mounting post; and
    wherein the mounting holes of the connecting portions of the mounting frame are aligned with the engaging posts, respectively, and the first fasteners are provided to extend through the mounting holes and connect with the engaging posts to fix the mounting frame on the enclosure.

2. The fan apparatus of claim 1, wherein each mounting post is located at the distal end of the corresponding mounting arm.

3. The fan apparatus of claim 1, wherein the main body is elongated.

4. The fan apparatus of claim 1, wherein the mounting frame is substantially U-shaped, and the mounting arms are substantially parallel to each other.

5. The fan apparatus of claim 4, wherein each connecting portion is in the form of a connecting tab protruding outwardly from the main body.

6. The fan apparatus of claim 5, wherein the connecting tabs are located at a same long side of the main body which is opposite to the long side of the main body where the mounting arms are.

7. The fan apparatus of claim 5, wherein each connecting tab is substantially L-shaped, and includes a first section extending upwardly from the main body and a second section extending outwardly from a top end of the first section.

8. The fan apparatus of claim 7, wherein the main body of the mounting frame is attached to the enclosure, and the second sections of the mounting tabs are placed on the top ends of the engaging posts, respectively.

9. A fan assembly for installation into an enclosure of an electronic device, the enclosure comprising a plurality of engaging portions each having a particular configuration, the fan assembly comprising:
    a centrifugal blower defining an air outlet at one side thereof, a plurality of fixing portions being formed on the centrifugal blower, a through hole being defined in each of the fixing portions;
    a substantially U-shaped mounting frame comprising:
        a main body; and
        two mounting arms extending from two ends of the main body;
        a plurality of connecting portions and a plurality of mounting portions provided thereon, the connecting portions configured to be mounted on the engaging portions of the enclosure, the mounting portions mimicking the configuration of the engaging portions, with each mounting portion being in the form of a mounting post having a thread hole defined therein, the mounting posts being formed on the mounting arms, respectively;
    a plurality of first fasteners configured for fixing the connecting portions of the mounting frame to the engaging portions of the enclosure; and
    a plurality of second fasteners configured for fixing the fixing portions of the centrifugal blower to the mounting portions of the mounting frame;
    wherein each second fastener is extended through a corresponding fixing portion and threaded into the thread hole of a corresponding mounting post.

10. The fan assembly of claim 9, wherein each engaging portion of the enclosure is in the form of an engaging post, each connecting portion of the mounting frame defines a mounting hole therein, the mounting holes of the connecting portions of the mounting frame are aligned with the engaging posts, respectively, and the first fasteners are provided to extend through the mounting holes and connect with the engaging posts to fix the mounting frame on the enclosure.

11. The fan assembly of claim 9, wherein each connecting portion is in the form of a connecting tab protruding outwardly from the main body.

12. The fan assembly of claim 11, wherein the connecting tabs are located at a same long side of the main body which is opposite to a long side of the main body where the mounting arms are.

13. The fan assembly of claim 12, wherein each connecting tab is substantially L-shaped, and includes a first section extending upwardly from the main body and a second section extending outwardly from a top end of the first section.

14. The fan assembly of claim 13, wherein the main body of the mounting frame is attached to the enclosure, and the second sections of the mounting tabs are placed on the top ends of the engaging posts, respectively.

\* \* \* \* \*